Dec. 13, 1960   K. J. B. CLARK   2,964,334
SPRING SUSPENSION FOR VEHICLE WHEELS
Filed Feb. 28, 1958   3 Sheets-Sheet 1
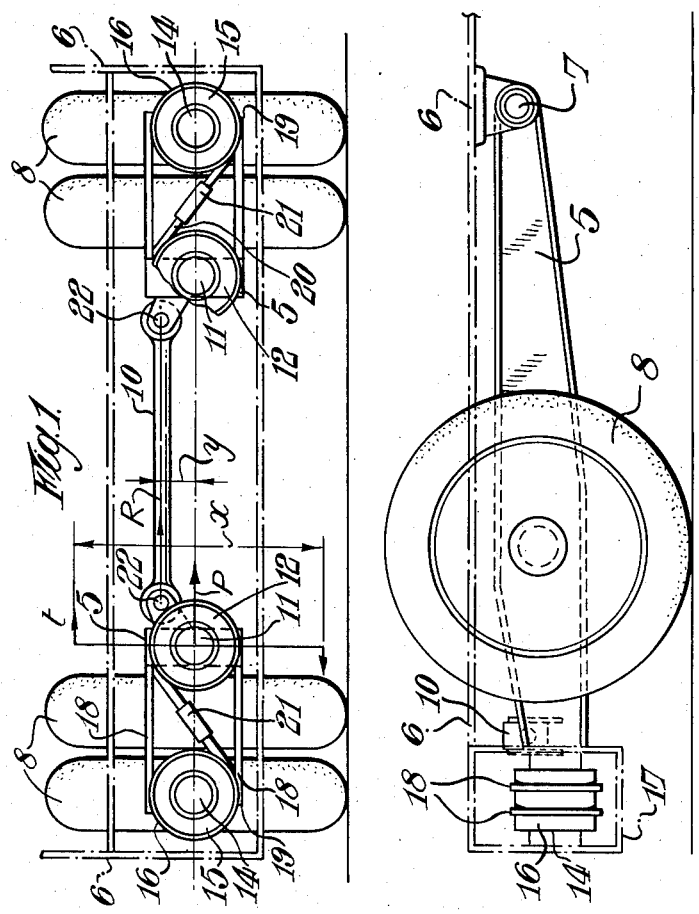
INVENTOR
KENNETH JOHN BENJAMIN CLARK Dec. 13, 1960  K. J. B. CLARK  2,964,334
SPRING SUSPENSION FOR VEHICLE WHEELS
Filed Feb. 28, 1958  3 Sheets-Sheet 2
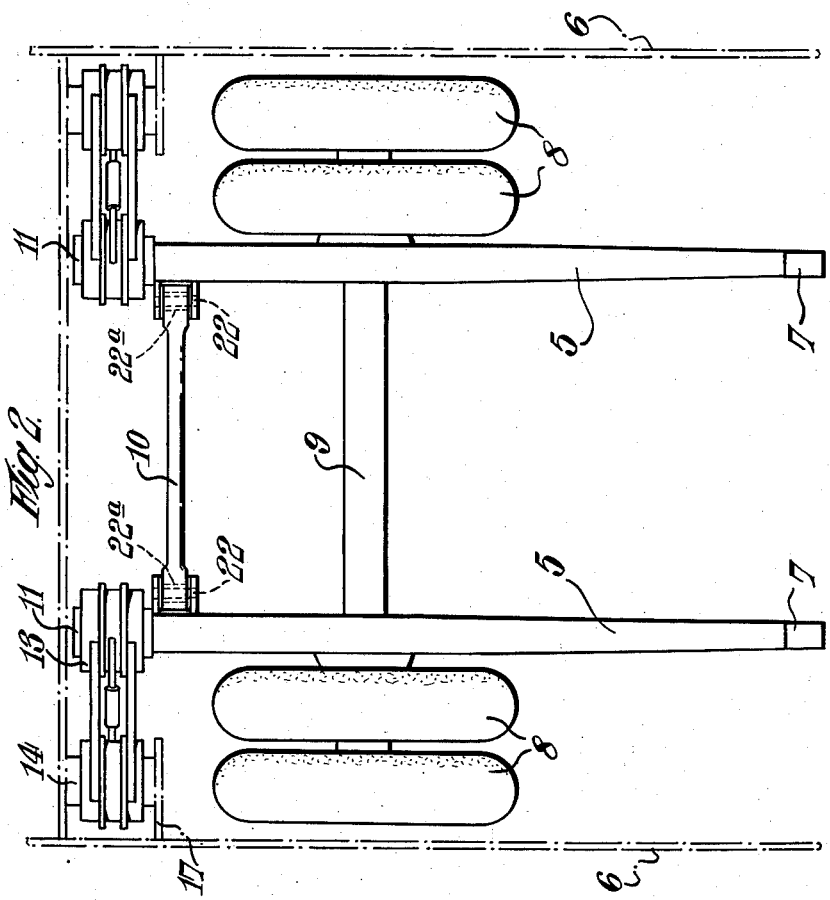
INVENTOR
KENNETH JOHN BENJAMIN CLARK

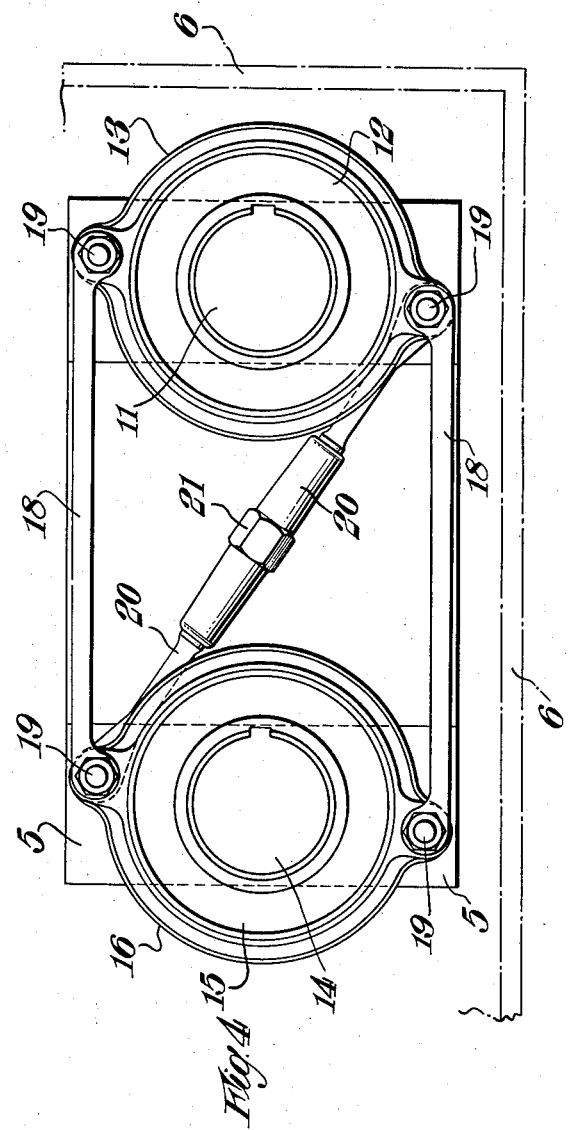

United States Patent Office 2,964,334
Patented Dec. 13, 1960

2,964,334

SPRING SUSPENSION FOR VEHICLE WHEELS

Kenneth John Benjamin Clark, Thurcaston, England, assignor to Metalastik Limited, Leicester, England Filed Feb. 28, 1958, Ser. No. 718,225

Claims priority, application Great Britain Mar. 12, 1957

3 Claims. (Cl. 280—124)

This invention relates to spring suspension systems for vehicles of the kind comprising a fore and aft extending beam on each side of an underframe or body of the vehicle, a pivotal connection between each beam and said underframe or body so as to permit relative up and down swinging movement between these parts, a mounting for a vehicle wheel on each beam, a cross-tie connecting the two beams together near the outer end of each beam and a spring acting between each beam (or a part secured thereto near to the cross-tie) and the underframe or body, said spring resisting said swinging movements.

Hitherto the beams have been rigidly connected together by a cross-tie so that differential swinging of the beams was prevented or at any rate was greatly reduced. However, if the beams have some freedom for differential swinging movement the wheels have the advantage of independent suspension but it is necessary to ensure that undesirable side forces are not applied to the beams as a consequence of the differential movement. Accordingly it is an object of this invention to provide such a suspension in which differential swinging of the beams is provided for while ensuring that the sideways forces on the beams are not excessive.

A further object of the invention is the provision of a suspension wherein the spring resistance to swinging movement of each beam increases at a greater rate than the increase in such movement. Thus, the resistance to small movements is correspondingly small and as the movements increase in magnitude the spring resistance increases and at a greater rate.

Yet another object is the provision of a suspension wherein the increased rate of resistance referred to is effective for upward and downward swinging movements of the beams.

This invention is characterised in that the cross-tie is pivotally connected to the beams so that the beams may rise and fall relatively to each other and is also arranged so that its long axis substantially coincides with the line of action of the resultant forces due to the torsional and compressive forces in the pair of springs. The position of the line of action of the resultant force depends upon the loading conditions and the position of the cross-tie will normally be selected to conform with the line of the resultant force produced for a loading slightly above full load and it is preferably selected so that within the normal loading range the unbalanced resultant forces applied to the beams is relatively small.

A practical application of the present invention will now be described, by way of example only, with reference to the accompanying drawings whereof:

Fig. 1 is an end view of a spring suspension according to the present invention, Fig. 2 is a plan view of Fig. 1, Fig. 3 is a side view of the suspension shown in Fig. 2, and Fig. 4 is an end view, to a larger size, of the spring for one of the beams.

Referring to the drawings: the spring suspension comprises fore-and-aft extending beams 5 one on each side of an underframe or body of the vehicle 6 (Fig. 2) a pivotal connection 7 between each beam 5 and the underframe 6 being provided so as to permit relative up and down swinging movement between these parts. A wheel, or a pair of wheels 8, is carried at each end of an axle 9 which extends across the beams 5 towards the rear end of the beams and is supported by the beams. A cross-tie 10 is provided extending transversely between the ends of the beams 5 remote from the pivotal connections 7, the construction and disposition of the cross-tie being more fully described hereinafter. The connections 7 preferably incorporate rubber bushes.

A pair of pivots 11 is carried, one each, at the end of beam 5 next to the cross-tie 10 and there is mounted on each pivot 11 a rubber bush 12 which is secured within an outer metal sleeve 13. A similar arrangement of pivot 14 rubber bush 15 and outer metal sleeve 16 is provided, the pivot 14 being carried by a sub-frame 17 secured to the underframe 6 of the vehicle it being appreciated, as shown in the accompanying drawing, that the assembly of parts 14, 15 and 16 is provided for each of the assemblies 11, 12 and 13. The pairs of outer metal sleeves 13, 16 are joined together by parallel spaced link bars 18 which are hinged, at 19 to the diametrically opposite points of the sleeves, 13, 16 so as to constitute a hinged parallelogram. An inextensible suspension link 20 is hinged to a pair of diagonally opposite points 19, the link 20 constituting a tie rod which is variable as to its length by means of a turnbuckle 21. In this way means is provided of pre-loading the resilient bushes of the two assemblies and re-setting them to give a desired arrangement of the system.

With the arrangement described relative rising and falling movement of the beams 5 and the frames 6 is applied to the rubber bushes 12, 15, which together with the links 20 constitute springs controlling the rising and falling movement. For small deflections the bushes act in torsion whereas larger deflections cause displacement of the axes of the pivots 11, 14 and this is resisted with increased stiffness by the rubber bushes as the metal sleeves become eccentric. Such eccentricity produces radial, compressive forces in the bushes. Preferably it is selected that under tare load the bushes are substantially unstressed so that with small load variations from the tare conditions (the position of Fig. 1) the bushes act in torsion while greater load variations results in radial, compressive forces in the bushes. While the bushes act in torsion the resistance to movements afforded by the bushes is relatively small but as the radial-compressive forces are brought into play the resistance to movement increases non-linearly and very rapidly, the resistance to movement being at a greater rate than the displacement which produces the compression in the bushes.

The consequence of the loading referred to is that torsion of the bushes results in a couple $xt$ (Fig. 1) and compression of the bushes produces a force P. The resultant of the couple and of the compression force is indicated at R the line of action of which is off set by an amount $y$ from the line of action of the compression forces. These considerations apply to both bush assemblies.

The cross-tie 10 is arranged so that the line of action of the resultant R due to a loading slightly above full load coincides substantially with the long axis of the tie. Consequently the cross-tie 10 has the resultant forces R applied axially to it and the cross-tie will resist such forces i.e. will resist the compressive and torsional forces produced in the bushes. However, it is an essential feature of this invention that the cross-tie is pivotally connected to the beams 5, as by the joints 22. It is arranged that the joints 22 incorporate rubber bushes 22a (see Fig. 2). Coupling tie 10 to beams 5 by joints 22 permits of differential swinging movements of the beams while ensuring that the cross-tie 10 carries the torsional and compressive forces referred to.

I claim:

1. A spring suspension for connecting the wheels of a vehicle with a frame of the vehicle comprising a fore and aft beam on each side of the vehicle, a vehicle wheel carried by each beam towards the rear end of the beam, a pivotal connection between the front end of each beam and the vehicle frame permitting up and down swinging movements of the beams, a cross-tie extending transversely of the vehicle between the beams, and a pivotal connection between the cross-tie and each beam, the pivotal connections permitting differential up and down swinging movements of the beams, for each beam, a pivot on the beam, a parallel pivot on the vehicle frame, and a spring means acting between the beam and the vehicle frame to resist the up and down swinging movements of the beam, the spring means comprising an inextensible suspension link extending transversely of the vehicle between the beam and the vehicle frame, and resilient bushes fixed one on each of said pivots and connecting the suspension link to the beam and the vehicle frame whereby relative rising and falling movement between the beam and the vehicle frame subjects the bushes to torsion and thereafter, for larger relative movements, to compression, said cross-tie being disposed with its long axis substantially coincident with the line of action of a resultant force due to torsional and compressive forces acting in each of said springs.

2. A spring suspension according to claim 1, wherein the cross-tie is disposed with its long axis substantially coincident with the line of action of the resultant force in each of said springs due to loading slightly above full load.

3. A spring system as claimed in claim 1 in which the pivotal connections of the cross-tie and the beams incorporate rubber bushes.

References Cited in the file of this patent

UNITED STATES PATENTS

| | | |
|---|---|---|
| 2,740,622 | Hickman | Apr. 3, 1956 |
| 2,827,282 | Weiss | Mar. 18, 1958 |
| 2,852,269 | Gaines | Sept. 16, 1958 |
| 2,866,632 | Clark | Dec. 30, 1958 |

FOREIGN PATENTS

| | | |
|---|---|---|
| 665,282 | Great Britain | Jan. 23, 1952 |
| 665,283 | Great Britain | Jan. 23, 1952 |